United States Patent
Kölln et al.

(10) Patent No.: US 7,301,152 B2
(45) Date of Patent: Nov. 27, 2007

(54) LIGHTWEIGHT PLANAR DETECTOR FOR OBJECTS CONTAMINATED WITH PARTICLE RADIATION

(75) Inventors: Ingo Kölln, Hamburg (DE); Sören Reiche, York (DE)

(73) Assignee: Rados Technology GmbH, Hamburg (DE)

( * ) Notice: Subject to any disclaimer, the term of this patent is extended or adjusted under 35 U.S.C. 154(b) by 100 days.

(21) Appl. No.: 11/173,260

(22) Filed: Jul. 1, 2005

(65) Prior Publication Data

US 2006/0231766 A1   Oct. 19, 2006

(30) Foreign Application Priority Data

Apr. 16, 2005   (DE) .................. 10 2005 017 557

(51) Int. Cl.
*G01T 1/20* (2006.01)
(52) U.S. Cl. .................................... 250/368
(58) Field of Classification Search ............... 250/368
See application file for complete search history.

(56) References Cited

U.S. PATENT DOCUMENTS

| | | | | |
|---|---|---|---|---|
| 4,739,168 A | * | 4/1988 | Aoki ........................ | 250/368 |
| 5,391,878 A | | 2/1995 | Petroff | |
| 5,780,856 A | * | 7/1998 | Oka et al. .................. | 250/367 |
| 6,512,231 B1 | | 1/2003 | Moy | |
| 2002/0172478 A1 | * | 11/2002 | Sahlin ........................ | 385/115 |
| 2004/0238749 A1 | | 12/2004 | Fontbonne et al. | |
| 2004/0251417 A1 | | 12/2004 | Yamaguchi et al. | |
| 2005/0189495 A1 | * | 9/2005 | Ito et al. ................... | 250/368 |

FOREIGN PATENT DOCUMENTS

| | | |
|---|---|---|
| EP | 0 740 167 A1 | 10/1996 |
| JP | 4-24582 | 1/1992 |
| JP | 9-243752 | 9/1997 |
| JP | 11044768 | 2/1999 |
| JP | 2001-311777 | 11/2001 |

OTHER PUBLICATIONS

V. Filippini, M. Marchesotti; Position reconstuction in a scintillator coupled to proximity focused HPDs using the light division method; Nuclear Instruments and Methods in Physics Research A 457 (2001); pp. 279-287.

(Continued)

*Primary Examiner*—David Porta
*Assistant Examiner*—Christine Sung
(74) *Attorney, Agent, or Firm*—Marjama Muldoon Blasiak & Sullivan LLP

(57) ABSTRACT

A scintillation detector for measuring radioactive particle radiation includes at least one planar detector element made from a scintillator material. Each detector element is provided with a light guide which is placed on at least one planar side of the element, the light guide having two ends that are guided into an evaluation unit and which is configured as a wavelength shifting fibre. The evaluation unit includes one or more photomultipliers and a logic unit to which the signals of the photomultiplier(s) are applied. The two ends of the light guide are respectively connected to a separate photomultiplier or a channel of a photomultiplier and the outputs of the photomultiplier(s) are connected to the logic unit which produces an output signal for a detector element when the signals are substantially simultaneously applied to the ends of the light guide of a detector.

11 Claims, 2 Drawing Sheets

OTHER PUBLICATIONS

R. Naka, K. Watanabe, J. Kawarabayashi, A. Uritani, T. Iguchi, N. Hayashi, N. Kojima, T. Yoshida, J. Kaneko, H. Takeuchi and T. Kakuta; Radiation Distribution Sensing With Normal Optical Fiber; IEEE Transactions on Nuclear Science; vol. 48, No. 6, Dec. 2001; pp. 2348-2351.

M.L. Crow, J.P. Hodges, R.G. Cooper; Shifting scintillator prototype large pixel wavelength-shifting fiber detector for the POWGEN3 powder diffractometer; Nuclear Instruments & Methods in Physics Research A529 (2004); pp. 287-292.

Saint-Gobain Crystals; Plastic Scintillating Fibers; XP-002387760A; c 2005; 6 pgs.

* cited by examiner

LIGHTWEIGHT PLANAR DETECTOR FOR OBJECTS CONTAMINATED WITH PARTICLE RADIATION

FIELD OF THE INVENTION

The following invention relates to a scintillation detector for measuring radioactive radiation, in particular, it relates to a lightweight planar detector for particle radiation.

BACKGROUND OF THE INVENTION

In high-energy physics it is known to use cassette-shaped scintillation cells, which for example consist of 5×5 cm discs with a thickness of 0.5 cm and which are provided with a circular groove. A wavelength shifting fibre is inserted into the groove, whose end terminates in a photomultiplier. Wavelength shifting fibres are synthetic fibres which produce a shifting of the wavelength. Light entering, in particular light entering via the longitudinal side, generates new light entering via the longitudinal side, generates new light flashes in the fibre. The newly generated light flashes spread within the fibre and reach its end from where they are passed to the photomultiplier.

SUMMERY OF THE INVENTION

The object of the present invention is to provide a scintillation detector which, even with large-area detector material, offers good signal yield with simultaneous noise suppression.

The scintillation detector according to the invention serves to measure radioactive particle radiation. The detector has a plurality of planar detector elements made from scintillator material. Each detector element is provided with a light guide which is placed on at least one planar side of the element and whose two ends are guided into an evaluation unit. Positioned on the detector element is therefore a continuous light guide whose two ends are guided out of the detector element into an evaluation unit. The light guide is, moreover, configured as a wavelength shifting fibre which upon excitation generates light of another wavelength in the fibre. The evaluation unit contains at least one photomultiplier and a logic unit to which the signals of the photomultiplier(s) are applied. The two ends of the light guide are respectively connected to a separate photomultiplier or to separate channels of a photomultiplier array whose output signals are applied to the logic unit. The evaluation unit generates an output signal for a detector element only when the corresponding photomultiplier or the channels of the photomultiplier substantially simultaneously generate a signal. Within the meaning of the invention, semiconductor diodes or avalanche diodes are also suitable as photomultipliers. Therefore a signal is only generated when there is a coincidence of signals at the outputs of the light guide. Coincidence counting has the advantage that noise in the signals is suppressed. It has been shown, in particular with a detector for a whole body contamination monitor, with which personnel may be monitored for radioactive radiation, that noise suppression leads to better results within the same measuring time. Moreover, it has been shown that the detector according to the invention may be particularly easily constructed, in particular with a simple plastics housing without electronics.

In a preferred embodiment the detector element is configured as a planar plate, the thickness of the scintillator material being 0.1 to 1 mm.

In order to prevent light loss, the detector material is at least partially enclosed by a reflector. Preferably the detector material is completed enclosed.

In order to be able to use a particularly planar plate for the detector material, the light guide is bonded to the scintillator material. To this end, an optically conductive adhesive is used.

In a preferred embodiment the light guide is preferably configured as a wavelength shifting fibre whose absorption spectrum differs from the emission spectrum. The light guide has a core and a cover which are manufactured from different plastics materials. Polystyrenes are provided as material for the core and polymethyl methacrylate (PMMA) and/or fluorinated polymers (FP) as the cover material. The light guide may be provided with a round cross-section or with an angular cross-section, with the angular cross-section preferably a rectangular cross-section with rounded edges being provided.

It has been shown that in a preferred embodiment the light guide is designed as a spiral-shape on the detector element. In this connection the middle of the light guide is arranged in the centre of the spiral and the light guide moves in a double-threaded spiral to one edge of the detector element.

In a preferred embodiment the light guide of the detector element is connected via two transparent light guides to the photomultiplier(s).

A particular advantage of the invention is that when using N photomultipliers (or a photomultiplier with N channels) a total of N (N−1)/2 detectors may be read out independently of one another.

BRIEF DESCRIPTION OF THE DRAWINGS

A preferred embodiment will be described in more detail hereinafter, in which.

DETAILED DESCRIPTION

Figure 1:
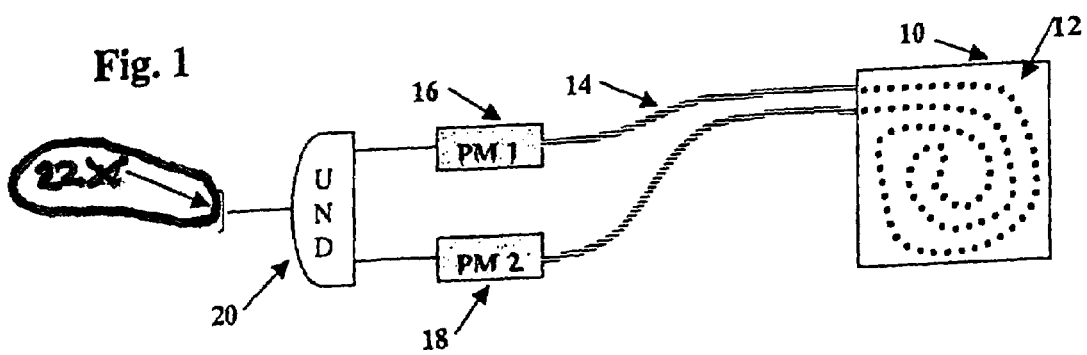
FIG. 1 depicts a detector element in accordance with one aspect of the invention including two photomultipliers and a logic evaluation unit.

A detector element 10 made from scintillator material has, for example, a surface area of 200 mm×200 mm. The scintillator material may be given a thickness of 0.25 mm. A WLS (wave length shifting) fibre 12 is bonded to the scintillator material and which has a length of approximately 2.5 m, with a thickness of 1 mm. The fibre 12 is embedded in an optically transparent layer with a thickness of approximately 1 mm, which is attached to the scintillator material. In other words, the WLS fibre 12 is embedded in an optically transparent material which serves as a carrier for the scintillator material. The WLS fibre 12 is embedded in an optically transparent material which serves as a carrier for the scintillator material. The WLS fibre 12 has a core made from polystyrene (PS) which has a refractive index of n=1.59. The core is provided with a cover made from polymethyl methacrylate (PMMA) which has a refractive index of 1.49. According to the embodiment, a further second cover may be provided around the first cover which consists of a fluorinated polymer, whose refractive index is lower than the refractive index of the first cover. Additionally, the second cover substantially serves to stop light from escaping from the waveguide. The wavelength shifting fibre 12 may merge with a transparent waveguide 14 which is connected to a photomultiplier 16, 18. The outputs of the photomultipliers 16, 18 are further connected to an evaluation unit 20, which generates an output signal 22 when the signals of the photomultipliers 16, 18 are substantially simultaneously applied. A coincidence of the light flashes on the ends of the light guide 12 and 14 is thus tested. The coincidence ensures that the recorded event is produced by the generation of a light flash in the detector 10. The output signal 22 of the evaluation unit 20 is applied, for example, to the evaluation unit for a personnel contamination monitor. The particular advantage of the arrangement shown in FIG. 1, is that by measuring the coincidence in the evaluation unit 20 the noise is suppressed in the scintillator and in the WLS fibre 12.

Figure 2:
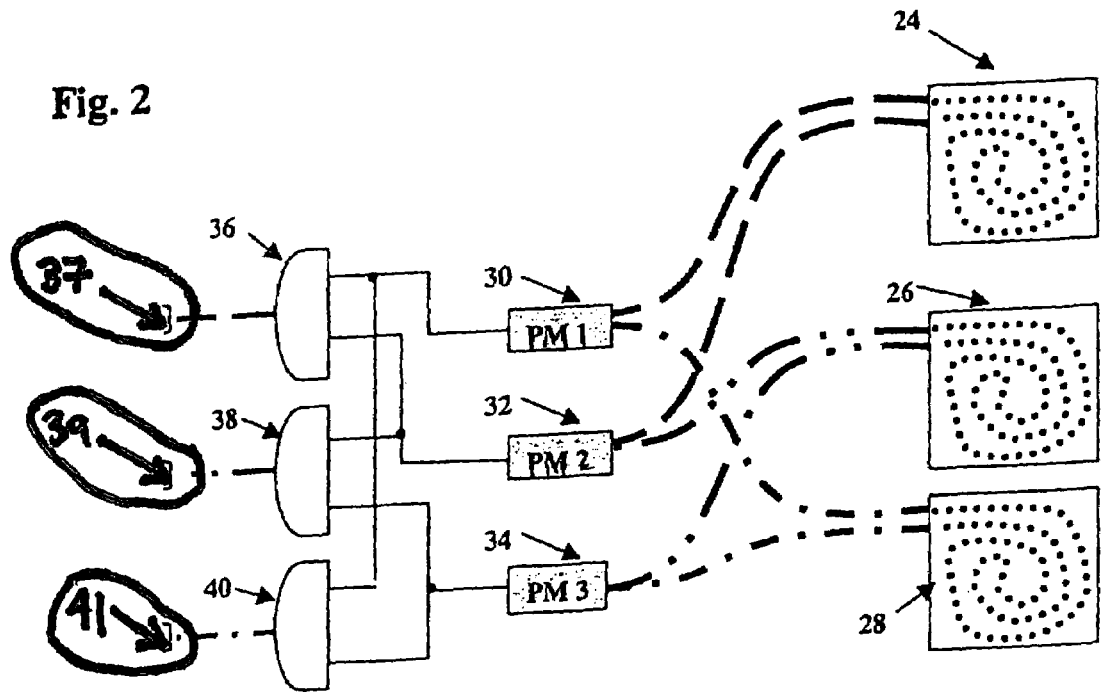
FIG. 2 depicts an arrangement of three detector elements in accordance with another aspect of the invention, including three output signals.

A particular advantage of the arrangement shown in FIG. 1 becomes clear in connection with FIG. 2. The detectors 24, 26 and 28 are connected to the photomultipliers 30, 32 and 34. In this case, to be precise, it is a multi-anode photomultiplier which may simultaneously read out a large number of channels. The channels are shown in the Figures by individual boxes even when they are different channels of an apparatus. In the example shown, the photomultiplier 30 obtains its input signals from the detectors 24 and 28, the photomultiplier 32 from the detectors 24 and 26 and the photomultiplier 34 from the detectors 26 and 28. By corresponding interconnection to the logic units 36, 38 and 40, three separate output signals 37, 39 and 41 are respectively produced for the individual detectors 24, 26 and 28.

Figure 3:
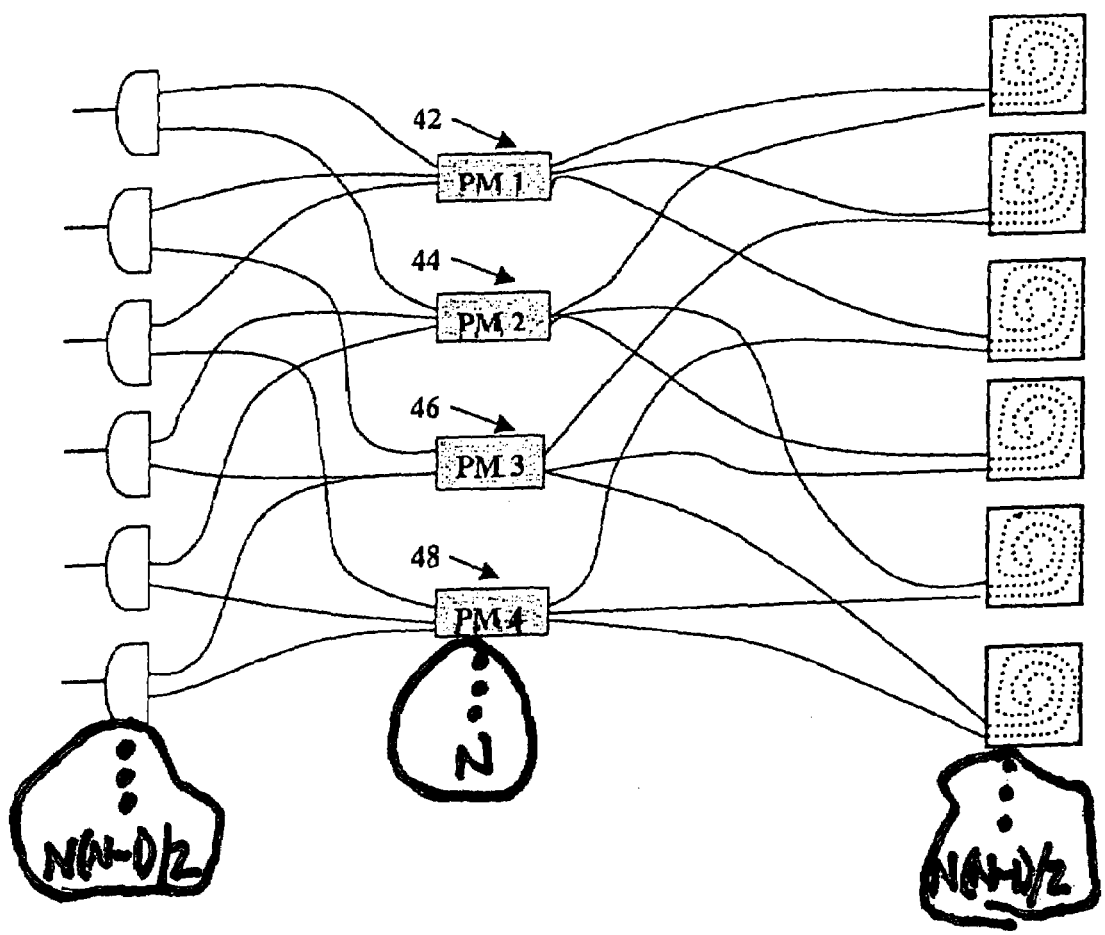
FIG. 3 depicts a corresponding interconnection for four detector elements.

On further examination, it has been shown that for N photomultipliers the signals of N (N−1)/2 detectors may be multiplied to a maximum and may be passed to an evaluation unit. In FIG. 3, for example, the wiring for four photomultipliers 42, 44, 46 and 48 is shown. The above connection between the number of photomultipliers and the number of possible detectors is based on the examples in FIG. 2 and FIG. 3 with the following observation: if a N+1 photomultiplier is added to a circuit arrangement of N photomultipliers, said photomultiplier may be connected to N additional detectors, with the output signals of the N+1 detector being connected to the N+1 photomultiplier and to one of the 1 to N photomultipliers already present. The evaluation units are correspondingly connected so that N(N−1)/2+N=(N+1) (N+1−1)/2 detectors are connected.

The result of said arrangement is that, when using commercial 16- or 64-channel photomultipliers, thus with an electron tube, a maximum of 120 or 2016 independent detectors may be read out. In practice, the number of independent counting channels is nevertheless limited by the ratio of fibre diameter to pixel size and by dead time effects, which however are generally in the nanosecond region. As a whole, the use of a multi-anode multiplier with a large number of channels represents quite a considerable cost saving.

The detectors are used for measuring radioactivity, in particular for $\alpha$ and $\beta$ measurement in personnel but also on tools or the surfaces of buildings. Gas proportional counter tubes are generally used therefor, which however are increasingly replaced by plastics scintillators, so-called beta-plast detectors. In the present invention, by the use of a synthetic wavelength shifting fibre whose two ends are read out via a coincidence circuit, the signal to noise ratio is markedly improved. Additionally, by multiple wiring of the multi-anode photomultiplier a large number of detectors may be simultaneously read out by electronic equipment, so that the total cost for the apparatus is markedly reduced.

The invention claimed is:

1. Scintillation detector for measuring radioactive particle radiation comprising:
   at least one planar detector element made from a scintillator material;
   said at least one planar detector element being provided with a light guide that is placed on at least one planar side of said element and in which each of two ends of said light guide are guided into an evaluation unit and which is configured as a wavelength shifting fibre;
   said evaluation unit comprising one or more photomultipliers and a logic unit to which the signals of said at least one photomultiplier are applied; and
   wherein the two ends of the light guide are respectively connected via a transparent wave guide to one of a separate photomultiplier and a channel of a photomultiplier and the outputs of the photomultiplier(s) are connected to the logic unit which produces an output signal for a detector element when the signals are substantially simultaneously applied to the ends of the light guide of a detector wherein the light guide is designed as a spiral-shape on the at least one detector element and in which the middle of the light guide is arranged in the center of the spiral.

2. Scintillation detector according to claim 1, wherein the at least one detector element is configured as a planar plate.

3. Scintillation detector according to claim 1, wherein the at least one detector element is provided in at least one region with a reflector.

4. Scintillation detector according to claim 1, wherein the light guide is configured as a wavelength shifting fibre whose absorption spectrum differs from the emission spectrum.

5. Scintillation detector according to claim 1, wherein the light guide comprises a core and a cover which are manufactured from different plastic materials.

6. Scintillation detector according to claim 5, wherein the core comprises polystyrenes (PS) and the cover comprises one of a polymethyl methacrylate (PMMA) and a fluorinated polymer (FP).

7. Scintillation detector according to claim 1, wherein the light guide has a round cross-section.

8. Scintillation detector according to claim 1, wherein the light guide has an angular cross-section with rounded corners.

9. Scintillation detector according to claim 1, wherein the light guide of the at least one detector element is connected via at least two light guides to the photomultiplier(s).

10. Scintillation detector according to claim 1, wherein with a number of N photomultipliers or N channels of a photomultiplier, a total of N(N−1)/2 detectors are read out.

11. Scintillation detector according to claim 1, wherein said detector is configured as a whole body monitor.

* * * * *